Figure 1:
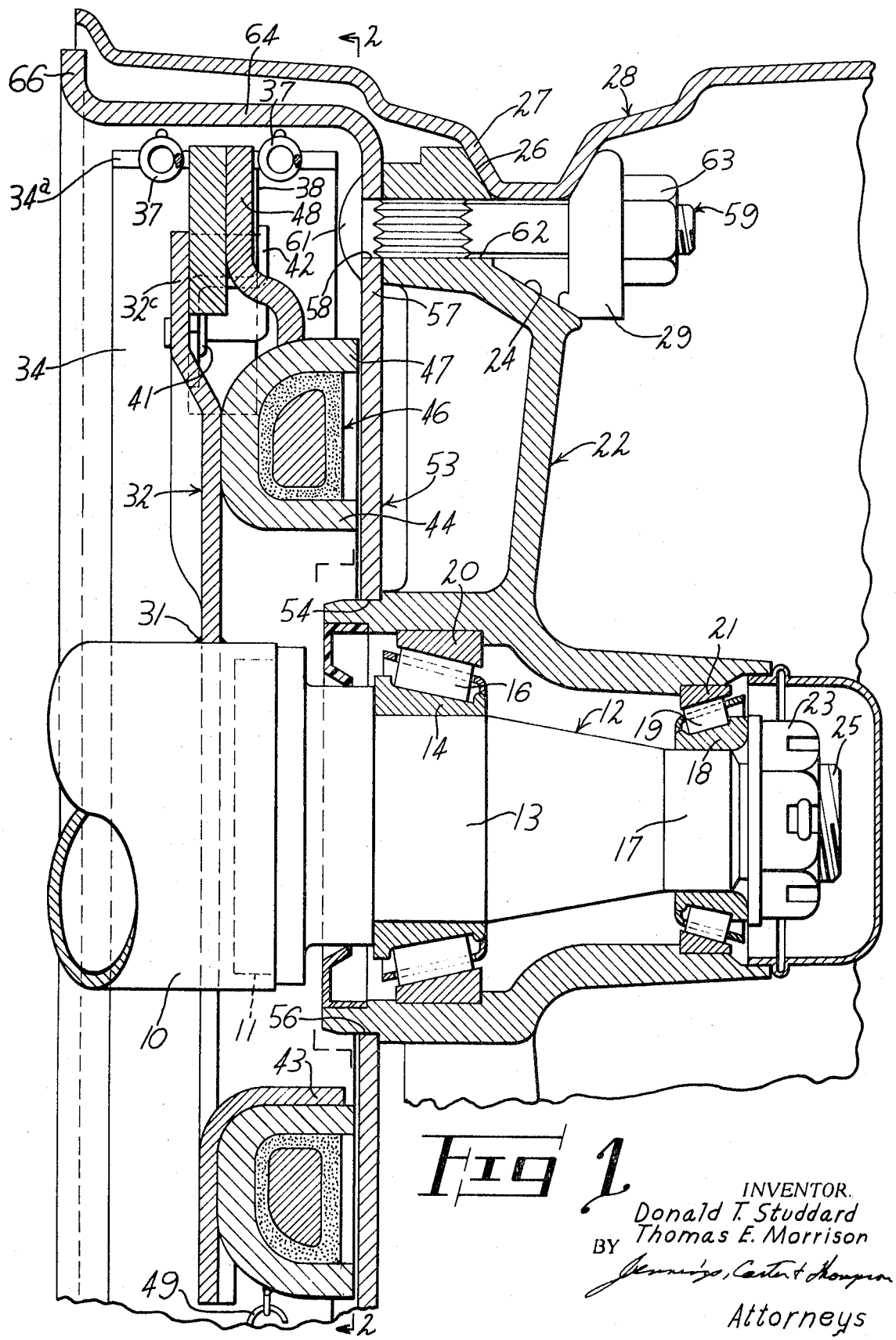

United States Patent

[11] 3,618,716

[72] Inventors Donald T. Studdard, Winfield; Thomas E. Morrison, Guin, both of Ala.
[21] Appl. No. 2,745
[22] Filed Jan. 14, 1970
[45] Patented Nov. 9, 1971
[73] Assignee Continental Conveyor and Equipment Company

[54] ELECTRIC BRAKE, DRUM, HUB AND RIM ASSEMBLY
3 Claims, 2 Drawing Figs.

[52] U.S. Cl. .................................... 188/138, 188/18, 188/218 R
[51] Int. Cl. ............................................ F16d 65/34, B60t 13/74
[50] Field of Search ........................................ 188/18, 138, 218 R, 161; 301/13, 19

[56] References Cited
UNITED STATES PATENTS

| | | | |
|---|---|---|---|
| 1,822,564 | 9/1931 | Cadman | 188/138 |
| 2,083,229 | 6/1937 | Horn et al. | 301/19 UX |
| 2,089,508 | 8/1937 | Sneed | 188/218 X |
| 2,131,186 | 9/1938 | LeJeune | 188/218 UX |
| 2,457,352 | 12/1948 | Davidson | 188/218 |
| 3,184,001 | 5/1965 | Reinsch et al. | 188/218 X |
| 3,363,726 | 1/1968 | Koenig | 188/18 |
| 3,367,458 | 2/1968 | Self et al. | 188/18 X |

Primary Examiner—Duane A. Reger
Attorney—Jennings, Carter & Thompson

ABSTRACT: An electric brake, drum, hub and rim assembly in which the drum itself is formed of a single piece of steel plate so that the electric magnet portion of the brake mechanism contacts directly the head or inner plate of the drum. The outer or open end of the drum is provided with an integrally formed peripheral flange, thus to restrain the drum against bell-mouthing when the brakeshoe expands against the cylindrical part of the drum. Further, the drum is secured to the hub by headed bolts, the heads being on the inner surface of the drum head, and the bolts being long enough also to secure the hub to the tire rim, whereby the braking torque is transmitted directly from the drum to the rim of the tire.

INVENTOR.
Donald T. Studdard
Thomas E. Morrison
BY
Attorneys

ELECTRIC BRAKE, DRUM, HUB AND RIM ASSEMBLY

Our invention relates to improvements in electric brake systems for vehicles and contemplates an all steel drum, the drum being die-formed from a single piece of steel plate, whereby all machining on the drum is eliminated. The outer or open end of the drum is provided with an annular also integrally formed flange which adds strength to the drum and also affords extra heat dissipating surfaces. The electromagnet actuator for the brake system, when energized, contacts directly the inner surface of the head or radial wall of the drum, thereby providing a high magnetic permeability armature which cooperates with the magnet. Our improved system also is characterized by the provision of headed bolts and nuts, the bolts passing through the head of the drum and through the hub and also being long enough to secure the rim of a wheel directly to the hub.

In view of the foregoing it will be seen that our invention has for its object an electric brake, drum, hub and rim assembly which is economical to manufacture, which requires no machining of the drum, and in which the drum is of steel plate material thin enough quickly and efficiently to dissipate the heat generated during braking, yet strong enough for the head thereof to act as the rotating armature of the electromagnetic brake system. The use of a circle of headed bolts, located radially outward of the magnet and long enough to secure both the drum and tire rim to the hub, also is a feature of our improved design. Further, our invention lends itself to accurate die forming by the provision of a centrally located, accurately die-formed opening disposed to fit snugly over the machined seat therefor provided on the hub.

Figure 2:
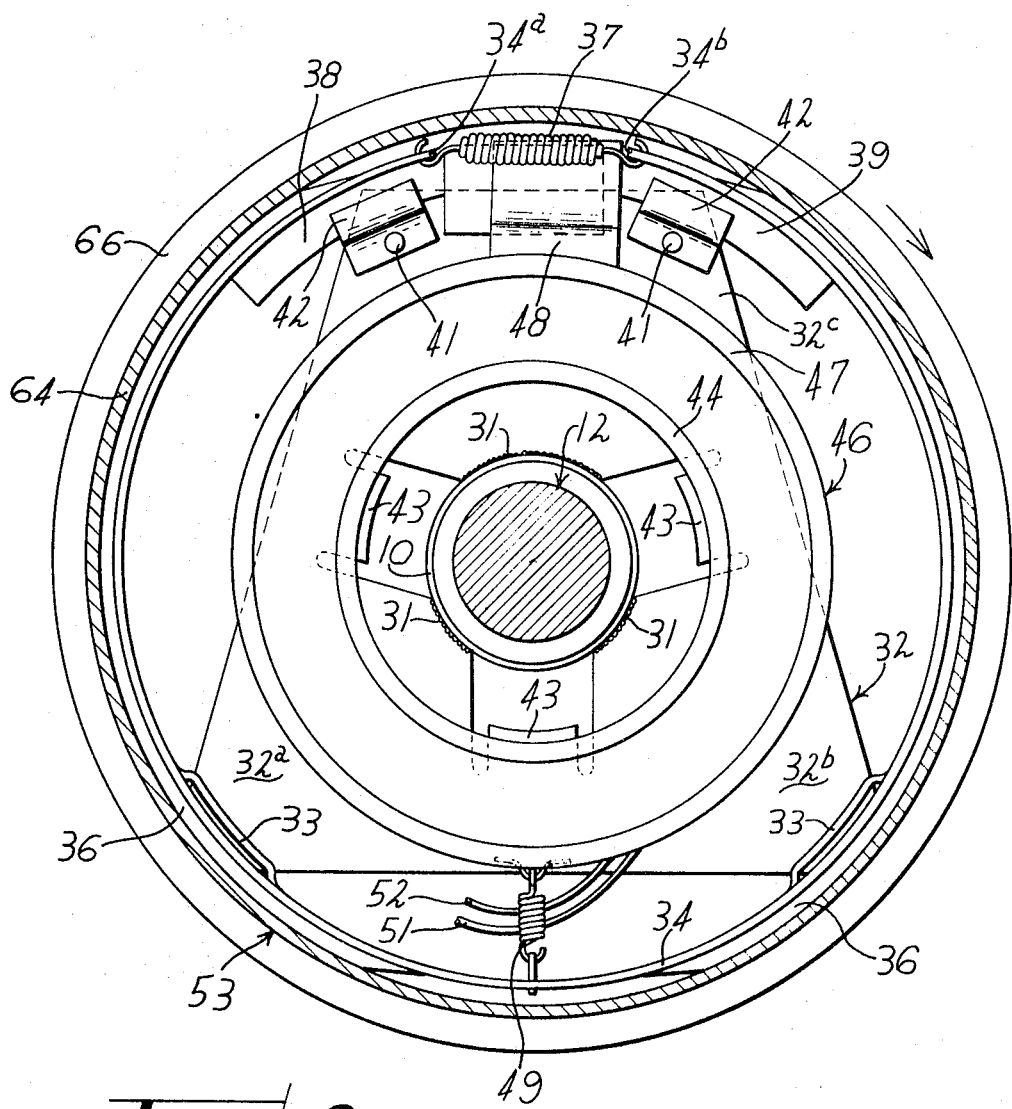

Apparatus illustrating features of our invention is shown in the accompanying drawings forming a part of this application, in which:

FIG. 1 is a vertical, fragmentary sectional view through a brake, hub and rim assembly incorporating our improvements; and, FIG. 2 is a view taken generally along line 2—2 of FIG. 1 and drawn to a somewhat reduced scale and showing the brake applied with the drum rotating in the direction of the arrow.

Referring now to the drawings for a better understanding of our invention we illustrate at 10 an axle which may be of the usual tubular form. Projecting into and secured within the end of the axle 10 is the end 11 of a spindle indicated generally by the numeral 12. As will be understood, the spindle 12 has an inner cylindrical portion 13 for receiving the inner race 14 of a bearing 16. In similar manner, there is a cylindrical portion 17 adjacent the outer end of the spindle for receiving the inner race 18 of an outer bearing 19.

Adapted to be supported on the outer races 20 and 21 of the bearings 16 and 19 is a hub indicated generally by the numeral 22. The hub is held in place on the end of the spindle by means of a nut 23 threaded onto the reduced end 25 of the spindle.

The hub 22 may be in spider form and each arm may have an inner sloping shoulder 24 and another sloping shoulder 26 located radially outward from shoulder 24. As will later appear, the purpose of the shoulder 26 is to receive one side of the drop center portion 27 of a pneumatic tire rim indicated generally at 28. The shoulder 24 receives the lower portions of securing lugs 29 which engage the opposite, drop center portion of the rim as illustrated.

Secured to the exterior of the tubular axle 10 as by welding at 31 is a backing plate 32 which forms part of an electromagnetic brake system. As best shown in FIG. 2 the backing plate is generally triangular in shape with two of its legs 32a and 32b rotatably confined between outstanding projections 33 carried by the metal-backing plate 34 which supports the brake linings 36. As is generally standard in the art, the metallic backing plate or shoe 34 terminates at 34a and 34b and the ends thereof are pulled toward each other by tension springs 37.

Secured to the inner surface of the plate 34, adjacent the ends 34a and 34b are blocks 38 and 39. Secured to the third leg 32c of the backing plate 32, by means of rivets 41 are outturned straps 42. These straps loosely surround the blocks 38 and 39 so that the ends of the backing plate 34 may be spread apart in a manner to be described, thus to force the brakeshoes 36 into frictional contact with the drum, also presently to be described.

The backing plate 32 also has out-turned lugs 43 thereon. Fitting rotatably about these lugs 43 is the inner ring 44 of a torodial shaped electromagnet indicated generally at 46. Thus, the inner ring 44 and the outer ring 47 of the electromagnetic form the magnet contact surfaces for the head of the drum as will presently appear.

Secured to the periphery of the outer ring 47 of the electromagnet 46 is a lug 48 which is disposed between the ends 34a and 34b of the metal-backing plate 34. The electro magnet may be stabilized in its central position by means of a spring 49 and current may be supplied to the electromagnet through leads 51 and 52.

Our improved form of brake drum is indicated in the drawings generally by the numeral 53. Thus, this brake drum is formed of a single piece of plate steel, die-formed to provide at its center an accurately shaped round hole 54 which fits about a machined seat 56 adjacent the inner end of the hub. The head or radially extending portion 57 of the drum is provided with a circle of bolt holes 58, whereby a plurality of bolts 59, having heads 61 located on the inner surface of the radial portion 57 of the drum, may pass through the openings 58, through correspondingly located openings 62 in the arms of the hub and thence outwardly far enough to receive the lugs 29. The bolts are press fitted into openings 62 so that they remain in place when the rim is removed, as will appear. Thus, with a single row of bolts we secure the drum 53 to the hub and also through the use of the lugs 29 the drop center portion of the rim is secured to the hub when the nuts 63 are run up. It will be noted that the inner ends of the lugs 29 contact the shoulders 24, while their outer ends contact the outer surfaces of the dropped center portion of the rim.

It will further be noted that the cylindrical portion 64 of the drum is provided at its outer end with an out-turned integrally formed flange 66.

From the foregoing it is now possible to explain more in detail the construction and advantages of our invention. First, it will be seen that since the drum in its entirety is made of a single piece of sheet steel the pole pieces 44 and 47 of the electromagnet 46 cooperate directly with the inner surface of the head 57 to produce the braking effect. That is to say, when current is applied through the leads 51 and 52, with the hub and hence the drum 53 rotating and since the magnet carries the block 48, the friction tends to rotate the magnet, separating the ends 34a –34b and forcing the brake lining against the inner surface of the cylindrical portion 64 of the drum, thus applying the brakes.

It will be particularly noted that the provision of the flange 66 effectively prevents bell-mouthing of the drum when the brakes are applied and that this is true even though the entire flange, drum portion 64 and head 57 are made of relatively thin sheet steel. Furthermore, since the magnetic permeability of steel is about twice that of cast iron, by allowing the electromagnet to cooperate directly with the steel head we afford an efficient magnetic coupling for braking purpose.

It will also be seen that the provision of the bolt circle, employing bolts with the heads on the inside of the radial wall 57 of the drum and which extend out far enough to secure the drum, hub and wheel rim together, is a feature which adds not only strength but economy of manufacture to our system. Thus, the torque of braking is applied directly through the bolts 59 from the drum to the rim.

From the foregoing it will be apparent that we have devised an improved, low cost, simple and efficient electromagnetic brake, drum, hub and rim assembly for vehicles. Our improved and simplified system lends itself readily to incorporation in identical units which are originally manufactured without the brake system, this being done simply by welding the backing plate and its associated parts, including the magnet, to the axle 10. Most important, however, is the fact that we have, by eliminating the machining of the drum, provided a drum which is just as efficient, but much cheaper than cast drums. Since the stems of bolts 59 are press fitted into the openings 62 in the hub arms, the hub and drum remain assembled when the nuts 63 are removed, as when changing rims.

While we have shown our invention in but one form, it will be obvious to those skilled in the art that it is not so limited, but is susceptible of various other changes and modifications without departing from the spirit thereof.

We claim:
1. In a brake system,
a. an all steel drum formed from a single piece of plate and having a radial inner wall and a cylindrical section extending outwardly from the radial wall,
b. an annular out-turned flange on the outer end of the cylindrical section formed integrally with the cylindrical section,
c. an electric brake embodying a backing plate and an electromagnet together with an expandable brakeshoe located on the inside of the drum in position for the magnet when energized to contact directly the inner surface of the radial wall of the drum, thereby to expand the brakeshoe into braking contact with the inner surface of the cylindrical section,
d. a hub on which the drum is mounted,
e. a spindle and axle assembly, the hub being rotatably received on the spindle and the backing plate being secured to the axle, whereby upon energization of the magnet brakeshoe expanding forces are transmitted directly from the radial inner wall of the drum to the brakeshoe, said flange and radial rear wall holding the cylindrical section against radial distortion in response to outward thrust of the brakeshoe against the inner surface of the cylindrical section,
f. the drum being secured directly to the hub by means of a set of headed bolts the heads of which engage the inner surface of the radial wall of the drum, said bolts being long enough to secure the central portion of a tire rim or the like onto the hub, and
g. nuts for the bolts, whereby a single set of said bolts holds the drum, hub and rim operatively assembled.

2. Apparatus as defined in claim 1 in which the tire rim is of the drop center type and in which the hub has shoulders thereon against which one side of the dropped center of the rim engages, there being other shoulders on the hub located radially inwardly of the first named shoulders, said bolts passing between said shoulders, and lugs surrounding the bolts and disposed to engage the opposite side of the dropped center of the rim and said other shoulders, whereby when nuts on the bolts are drawn up the rim is clamped between the first named shoulders and the lugs.

3. Apparatus as defined in claim 2 in which the bolts are fixedly secured in the bolt openings of the hub, whereby the drum and hub are held assembled when the nuts are removed, as when changing rims.

* * * * *